United States Patent
Speziari et al.

(10) Patent No.: US 11,090,981 B2
(45) Date of Patent: Aug. 17, 2021

(54) TYRE FOR VEHICLE WHEELS

(71) Applicant: Pirelli Tyre S.p.A., Milan (IT)

(72) Inventors: Diego Speziari, Milan (IT); Carlo Ravizza, Milan (IT); Gianfranco Colombo, Concorezzo (IT)

(73) Assignee: PIRELLI TYRE S.p.A., Milan (IT)

( * ) Notice: Subject to any disclaimer, the term of this patent is extended or adjusted under 35 U.S.C. 154(b) by 298 days.

(21) Appl. No.: 16/065,486

(22) PCT Filed: Dec. 13, 2016

(86) PCT No.: PCT/IB2016/057564
§ 371 (c)(1),
(2) Date: Jun. 22, 2018

(87) PCT Pub. No.: WO2017/115195
PCT Pub. Date: Jul. 6, 2017

(65) Prior Publication Data
US 2019/0023077 A1    Jan. 24, 2019

(30) Foreign Application Priority Data

Dec. 29, 2015    (IT) .................. 102015000088583

(51) Int. Cl.
*B60C 11/03* (2006.01)
*B60C 11/13* (2006.01)

(52) U.S. Cl.
CPC ........ *B60C 11/0304* (2013.01); *B60C 11/033* (2013.01); *B60C 11/0306* (2013.01);
(Continued)

(58) Field of Classification Search
CPC ............. B60C 11/0304; B60C 11/0306; B60C 11/033; B60C 11/1307; B60C 11/1315;
(Continued)

(56) References Cited

U.S. PATENT DOCUMENTS 5,361,814 A * 11/1994 Covert ................ B60C 11/0306
152/209.16
6,439,285 B1 * 8/2002 Elkurd ................ B60C 11/0332
152/209.18
(Continued)

FOREIGN PATENT DOCUMENTS

DE    10 2009 003 565 A1    9/2010
EP        2 829 421 A1    1/2015
(Continued)

OTHER PUBLICATIONS

Susumu Watanabe, JP-02179508-A, machine translation. (Year: 1990).*
(Continued)

*Primary Examiner* — Robert C Dye
*Assistant Examiner* — Sedef E Paquette
(74) *Attorney, Agent, or Firm* — Finnegan, Henderson, Farabow, Garrett & Dunner, L.L.P.

(57) ABSTRACT

A tyre for vehicle wheels comprises a tread band on which a radially external tread surface and a tread pattern are defined; the tread band comprising: a central region of the tread band, extending circumferentially about an equatorial plane of the tyre over at least 30% of an effective width of the tread band; a first and a second shoulder region extending, on opposite sides of the central region, each over at least 20% of the effective width of the tread band; the tread pattern, on the first and second shoulder regions and the central region, comprises transverse grooves comprising a bottom and a pair of opposed lateral walls. These lateral walls extending from the bottom towards the tread surface with a first inclination, and joining to the tread surface by chamfers having a second inclination greater than the first inclination relative to the radial direction.

23 Claims, 2 Drawing Sheets

(52) U.S. Cl.
CPC ...... *B60C 11/1307* (2013.01); *B60C 11/1392* (2013.01); *B60C 2011/0341* (2013.01); *B60C 2011/0348* (2013.01); *B60C 2011/0365* (2013.01); *B60C 2011/0367* (2013.01); *B60C 2011/0381* (2013.01); *B60C 2011/0388* (2013.01); *B60C 2200/04* (2013.01)

(58) Field of Classification Search
CPC ............. B60C 11/1376; B60C 11/1384; B60C 11/1392; B60C 2011/0339; B60C 2011/0341; B60C 2011/0348; B60C 2011/0358; B60C 2011/0365; B60C 2011/0367; B60C 2011/0369; B60C 2011/0381; B60C 2011/0388; B60C 2200/04
USPC ................................ 152/209.1, 209.8, 209.9
See application file for complete search history.

(56) References Cited

U.S. PATENT DOCUMENTS

| | | | | |
|---|---|---|---|---|
| 6,520,230 | B1* | 2/2003 | Ratliff, Jr. | ........... B60C 11/0302 152/209.15 |
| 8,844,594 | B2* | 9/2014 | Ohashi | ................ B60C 11/0316 152/209.21 |
| 2004/0069389 | A1* | 4/2004 | Ratliff, Jr. | ........... B60C 11/1384 152/209.15 |
| 2005/0072505 | A1* | 4/2005 | Takahashi | ................ B60C 11/13 152/209.15 |
| 2006/0108039 | A1* | 5/2006 | Kaji | .................... B60C 11/1392 152/209.15 |
| 2011/0088821 | A1* | 4/2011 | Imakita | ............... B60C 11/1315 152/209.15 |
| 2015/0075686 | A1 | 3/2015 | Suga | |
| 2015/0251500 | A1* | 9/2015 | Pokutta-Paskaleva | ..................... B60C 11/1236 152/209.25 |
| 2015/0258858 | A1 | 9/2015 | Kujime | |
| 2016/0101655 | A1* | 4/2016 | Shibayama | ......... B60C 11/1323 152/209.18 |
| 2016/0368326 | A1* | 12/2016 | Wakizono | ........... B60C 11/0304 |
| 2017/0050470 | A1* | 2/2017 | Kanematsu | ......... B60C 11/1369 |
| 2017/0106703 | A1* | 4/2017 | Kubo | .................. B60C 11/1236 |

FOREIGN PATENT DOCUMENTS

| | | | | |
|---|---|---|---|---|
| EP | 2 918 427 | A2 | 9/2015 | |
| JP | 02179508 | A * | 7/1990 | ......... B60C 11/1384 |
| JP | 06024213 | A * | 2/1994 | ......... B60C 11/1392 |
| JP | 07186623 | A * | 7/1995 | ......... B60C 11/1315 |
| JP | 2006218946 | A * | 8/2006 | ......... B60C 11/1384 |
| WO | WO 2010/099839 | | 9/2010 | |
| WO | WO 2014/056651 | A1 | 4/2014 | |
| WO | WO 2016/198296 | A1 | 12/2016 | |

OTHER PUBLICATIONS

Koujirou Daisei, JP-07186623-A, machine translation. (Year: 1995).*
Takashi Gomyo, JP-2006218946-A, machine translation. (Year: 2006).*
Susumu Watanabe, JP-06024213-A, machine translation. (Year: 1994).*
International Search Report form the European Patent Office in corresponding International Application No. PCT/IB2016/057564 dated May 12, 2017.
Written Opinion of the International Searching Authority from the European Patent Office in corresponding International Application No. PCT/IB2016/057564 dated May 12, 2017.

* cited by examiner

TYRE FOR VEHICLE WHEELS

CROSS REFERENCE TO RELATED APPLICATIONS

This application is a Section 371 national phase application based on International Application No. PCT/162016/057564, filed Dec. 13, 2016, which claims priority of Italian Patent Application No. 102015000088583, filed Dec. 29, 2015; the contents of each application expressly incorporated herein by reference.

The present invention relates to a tyre for vehicle wheels, particularly to a tyre for high-performance motor cars.

A tyre generally comprises a carcass structure, shaped toroidally about an axis of rotation and comprising at least one carcass ply having terminal edges engaged in corresponding annular fixing structures, called bead cores.

In a position radially outside the carcass structure, there is provided a belt structure comprising, in the case of car tyres, at least two radially superimposed strips of rubberized fabric provided with reinforcing cords, usually metallic, positioned parallel to each other in each strip but crossing the cords of the adjacent strip, the cords being preferably positioned symmetrically about the equatorial plane of the tyre.

Preferably, the belt structure also comprises a third layer of fabric or metal cords placed circumferentially (at 0 degrees) in a radially outer position, at least on the ends of the underlying belt strips. In tubeless tyres, a radially inner layer called the liner, which is airtight, is also provided, in order to ensure the airtightness of the tyre.

In a position radially outside the belt structure there is applied a tread band, made of elastomeric material, on which a tread surface intended to contact the road surface is defined.

To ensure adequate road holding even on a wet road surface, tyres have tread bands with grooves of various shapes and geometries, the main purpose of which is to discharge any water present between the tyre surface and the road surface at the moment of mutual contact, thus preventing the hydrostatic pressure due to the impact of the water on the moving tyre from causing the tyre to lift, even partially, from the road surface, leading to a loss of control of the vehicle (a phenomenon known as aquaplaning).

Grooves formed in a circumferential direction may also affect the directionality and stability of running of the tyre in relation to lateral (drift) forces acting parallel to the axis of rotation of the tyre.

On the other hand, grooves formed in a transverse direction may affect the traction characteristics of the tyre, in other words its capacity to transmit tangential forces parallel to the direction of running to the road surface, during the acceleration and braking of the motor vehicle.

The applicant has noticed that an increased width of the transverse grooves improves traction, especially on wet surfaces, but excessive use may compromise performance on dry surfaces and increase the noise of the tyre, especially where these wider transverse grooves are provided in a considerable number and on the shoulder areas of the tyre. In fact, one of the main causes of noises is the continual succession of impacts of the edges of the grooves and/or blocks on the road surface.

The applicant has also noticed that the number and configuration of the grooves formed in the tread band may directly affect important environmental parameters of the tyre, such as the rolling resistance, which is directly related to the vehicle's fuel consumption.

In order to maintain a high safety level in all conditions of use, the tyre must, in the first place, have excellent braking performance (on both dry and wet surfaces). This characteristic is even more relevant in tyres for high-performance motor cars, which must also have high lateral grip and excellent handling and comfort characteristics.

However, the applicant has noticed that modifications of the dimensional parameters of the grooves that improve the braking and handling characteristics may adversely affect other important tyre performances.

For example, wider and deeper transverse grooves improve the braking and handling performance on a wet surface, but increase the noise.

The applicant has felt the need to provide a tread pattern capable of providing improved braking and handling performance in tyres for high-performance vehicles, for running on both dry and wet surfaces, together with improved rolling resistance, while containing the noise level and optimizing comfort.

The applicant has found that the mutually opposing problems described above are resolved by means of a tread pattern which provides chamfers on the lateral walls of the grooves formed both in the shoulder regions of the tyre and in the central region, and particularly on the transverse grooves.

In particular, in a first aspect, the invention relates to a tyre for vehicle wheels, comprising a tread band on which a radially external tread surface and a tread pattern are defined.

Preferably, the following are defined on the tread band:
a central region of said tread band, extending circumferentially about an equatorial plane of said tyre over a width equal to at least 30% of an effective width of said tread band; and
a first and a second shoulder region, extending, respectively, on opposite sides of said central region, in an axially outer position of said tread band, each over a width equal to at least 20% of an effective width of said tread band.

Preferably, said tread pattern, on each of said first and second shoulder region and on said central region, comprises a respective plurality of transverse grooves arranged sequentially along the circumferential development of said tread band.

Preferably, each of said transverse grooves comprises a bottom and a pair of lateral walls facing one another.

Preferably, said lateral walls of each transverse groove extend from said bottom towards said tread surface with a first inclination relative to a radial direction defined in said tyre.

Preferably, they are joined to said tread surface, in at least one of their portions, by a respective chamfer having a second inclination relative to said radial direction, which is greater than said first inclination.

Preferably, said second inclination in said chamfers is in the range from 30° to 60°.

Preferably, the tread pattern further comprises circumferential grooves.

Preferably, a void-to-rubber ratio of said chamfers formed on said plurality of transverse grooves and/or on said circumferential grooves is at least equal to 10% of the void-to-rubber ratio of said tread pattern.

Preferably, a void-to-rubber ratio of said chamfers formed on said plurality of transverse grooves and/or on said circumferential grooves is less than or equal to 25% of the void-to-rubber ratio of said tread pattern.

The applicant has verified that, owing to a significant presence of chamfers formed in the shoulders of the tread pattern, and particularly in the transverse grooves, the tyre exhibits excellent performance on wet and dry surfaces, as well as substantially lower levels of rolling resistance, together with limited noise.

The term "effective width" referred to the tread band defines the width of the radially outermost portion of the tread band (from edge to edge) intended for contact with the ground.

The term "equatorial plane" of the tyre defines a plane perpendicular to the axis of rotation of the tyre, which divides the tyre into two symmetrically equal parts.

A "circumferential" direction defines a direction generally lying along the direction of rotation of the tyre, or, in any case, slightly inclined relative to the direction of rotation of the tyre.

The "void-to-rubber ratio" defines the ratio between the total surface of the grooves in a given portion of the tread pattern of the tyre intended to bear on the ground (possibly the whole of the tread pattern) and the total surface of the given portion of tread pattern (possibly the whole of the tread pattern).

The term "chamfer" relating to a groove defines a portion of inclined plane that joins a lateral wall of the groove to the tread surface of the tyre, forming a discontinuity with the lateral wall and the tread surface in the radial direction. This inclined plane has an inclination relative to the radial direction of the tyre which is greater than the inclination of the lateral wall.

In the aforesaid aspect, the present invention may have at least one of the additional preferred characteristics indicated below.

Preferably, said tread pattern comprises, on said first shoulder region and on said second shoulder region respectively, a first and a second of said pluralities of transverse grooves. Each transverse groove of said first and/or second plurality may have a variable distance between the opposed lateral walls along the development of the groove. Preferably, at least a part of said chamfers is formed in portions in which said distance is smaller.

Preferably, each transverse groove of said first and/or said second plurality has, on the opposed lateral walls, respective chamfers with tapered profiles.

Preferably, said chamfers with tapered profiles have a substantially triangular development.

Preferably, in a first plurality of transverse grooves, said chamfers with tapered profiles extend from a respective vertex, defined in a median portion of the transverse groove, towards opposed ends of said transverse groove.

Preferably, in said first plurality of transverse grooves, each of said chamfers extends over a portion covering 30% to 50% of the development of the transverse grooves.

Preferably, in a second plurality of transverse grooves, said chamfers with tapered profiles extend from a respective vertex, defined in a median portion of said transverse groove, towards an axially inner end of said transverse groove.

Preferably, said axially inner end of said transverse groove opens into a circumferential groove. Preferably, this circumferential groove delimits a shoulder region.

Preferably, said tread pattern comprises, in said central region, a third plurality of transverse grooves. Preferably, said third plurality of transverse grooves has a decreasing width.

Preferably, each transverse groove of said third plurality has opposed ends opening into respective circumferential grooves.

Preferably, each transverse groove of said third plurality comprises a first portion with a first inclination relative to said equatorial plane and a second portion having a second inclination relative to said equatorial plane, this second inclination being different from said first inclination.

Preferably, the chamfers formed on said third plurality of transverse grooves extend substantially along the whole development of the opposed lateral walls.

Preferably, said tread pattern comprises, in said central region, a fourth plurality of transverse grooves. Preferably, the transverse grooves of said fourth plurality each have a cusp. Preferably, said cusp faces towards the equatorial plane.

Preferably, each transverse groove of said fourth plurality has a first end opposed to said cusp. Preferably, said first end opens into a circumferential groove.

Preferably, each transverse groove of said fourth plurality is positioned substantially in alignment with a respective transverse groove of said second plurality, formed in said second shoulder region.

Preferably, the chamfers formed on the transverse grooves of said fourth plurality extend along the whole development of the lateral walls of the transverse grooves.

Preferably, said tread pattern comprises a first circumferential groove which separates said first shoulder region from said central region.

Preferably, a chamfer is formed on a lateral wall of said first circumferential groove, this chamfer extending along the whole development of said first circumferential groove.

Preferably, said tread pattern comprises a second circumferential groove which separates said second shoulder region from said central region.

Preferably, said tread pattern comprises, in said central region, a third circumferential groove having a lateral wall on which is formed a chamfer extending along the whole development of said third circumferential groove.

Preferably, said tread pattern comprises, in said central region, a fourth circumferential groove having a plurality of chamfers extending in segments on at least one lateral wall of said fourth circumferential groove. Preferably, said chamfers extending in segments have a tapered profile, more preferably having a substantially triangular development.

Preferably, said chamfers are joined to said lateral walls at a depth of not more than 50%, or more preferably not more than 30%, of the total depth of the respective transverse groove in the corresponding portion.

BRIEF DESCRIPTION OF THE DRAWINGS

The characteristics and advantages of the invention will be more apparent from the detailed description of a preferred example of embodiment thereof, illustrated, for the purposes of guidance and in a non-limiting way, with reference to the attached drawings, in which.

Figure 1:
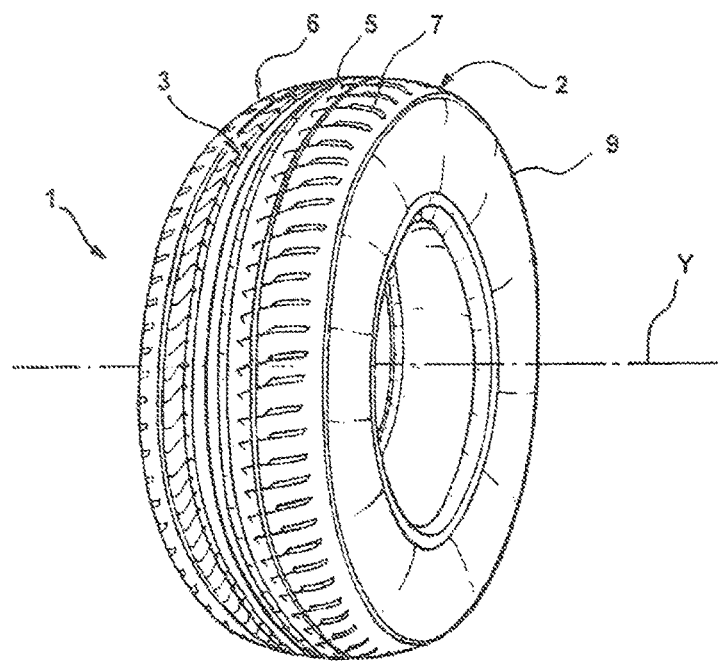
FIG. 1 is a perspective view of a tyre for vehicle wheels made according to the present invention.

With reference to the appended drawings, the number 1 indicates the whole of a tyre for vehicle wheels made according to the present invention.

The tyre 1 has a conventional, generally toroidal shape developed around an axis of rotation, defining an axial direction Y of the tyre, and having an equatorial plane X, perpendicular to the axis of rotation passing, through it.

The tyre 1 comprises a conventional tyre structure, not shown in the attached figures, and a tread band 2 on which is defined a tread surface 3 placed in a radially external position relative to the tread band 2 and intended to contact the road surface.

The tyre 1 is preferably designed to be mounted on a high-performance car and has a nominal cross-sectional width of about 215 to about 275 mm, for example about 245 mm, with a rim diameter of about 17 to 20 inches, for example 18 inches.

An effective width L, defined as the maximum width of the tread band intended to contact the ground in standard conditions of use, is identified on the tread band 2.

On the tread band 2 there are defined a central region 5, extending circumferentially and symmetrically about the equatorial plane X over a total width equal to about 50% of the effective width L, and a first shoulder region 6 and a second shoulder region 7 extending, respectively, on the axially opposed sides of the central region 5, in an axially outer position of the tread band 2.

The first and second shoulder regions 6 and 7 extend symmetrically over a distance equal to about 25% of the effective width L, and are delimited, on their sides opposite to the equatorial plane X, by respective lateral edges of the tread band 2, identified as 8 and 9 respectively.

Figure 2:
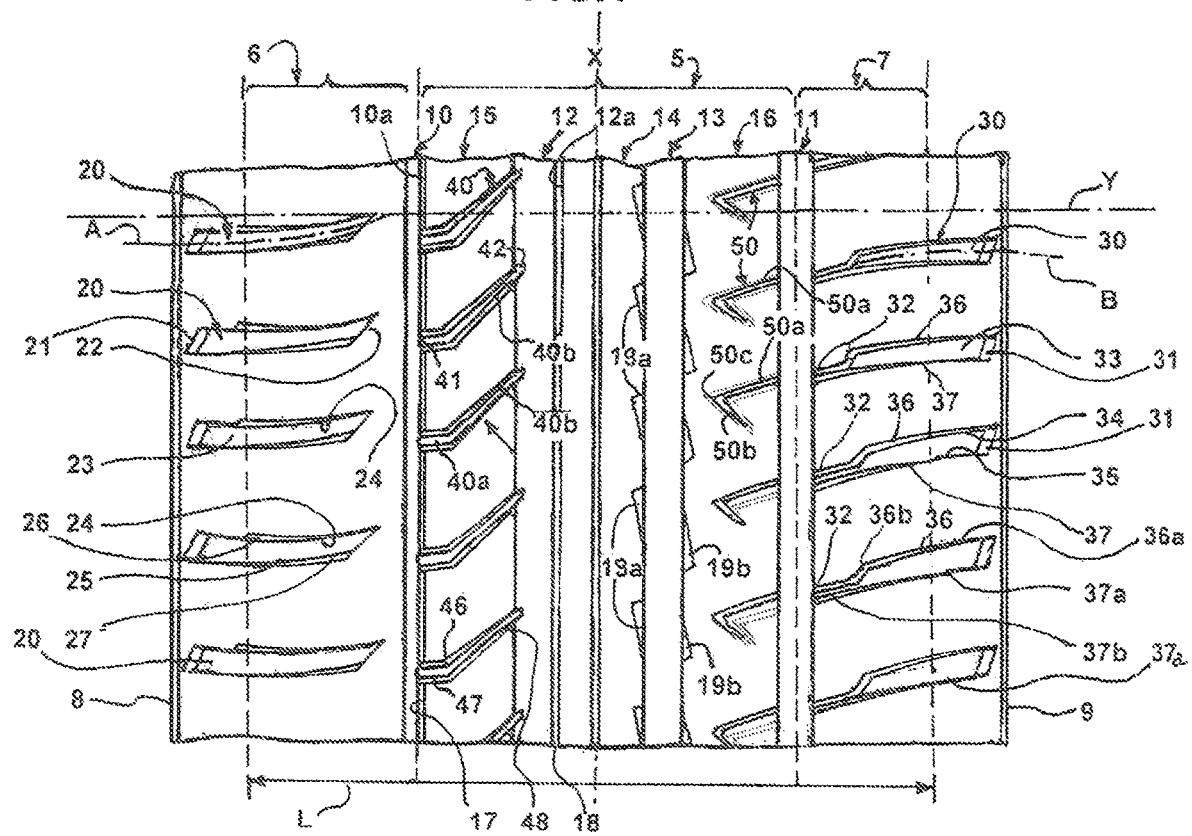
FIG. 2 is a schematic view on an enlarged scale of a detail of a significant region of the tread band of the tyre of FIG. 1.

In FIG. 2, the three regions defined above are delimited by broken lines. A plurality of grooves is delimited on the tread band 2, and these grooves, together with the blocks delimited by them, combine to form the tread pattern of the tyre 1.

In particular, the tread band 2 comprises a first circumferential groove 10 and a second circumferential groove 11, positioned symmetrically with respect to the equatorial plane, which delimit the central region 5 and separate it from the first and the second shoulder region 6 and 7 respectively.

Preferably, a third circumferential groove 12 and a fourth circumferential groove 13 are formed in the central region 5, these grooves extending symmetrically on sides opposite to the equatorial plane X.

The circumferential grooves 10, 11, 12 and 13 extend continuously around the circumferential development of the tread band 2, and have a substantially constant width and depth. In particular, the first circumferential groove 10 has a width of about 5.5 mm and a depth of about 7 mm, the second circumferential groove 11 has a width of about 10.5 mm and a depth of about 7 mm, the third circumferential groove 12 has a width of about 13 mm and a depth of about 7.5 mm, and, finally, the fourth circumferential groove 13 has a width of about 14 mm and a depth of about 7.5 mm.

Further to the provision of the circumferential grooves 10, 11, 12 and 13, a central band 14, extending between the third and the fourth circumferential groove 12 and 13, a first lateral band 15, extending between the first and third circumferential groove 10 and 12, and a second lateral band 16, extending between the fourth and the second circumferential groove 13 and 11, are defined on the central region 5.

The central circumferential band 14 is centred on the equatorial plane X, while the first and the second lateral bands 15 and 16 extend symmetrically on opposite sides to the central band 14.

On the first and second shoulder region 6, 7, and on the central region 5, there are formed a respective plurality of transverse grooves arranged sequentially along the circumferential development of the tread band 2.

In particular, a first plurality of transverse grooves 20 is formed on the first shoulder region 6 and a second plurality of transverse grooves 30 is formed on the second shoulder region 7, while a third and a fourth plurality of transverse grooves, indicated by 40 and 50 respectively, are formed on the first lateral band 15 and the second lateral band 16, respectively, of the central region 5.

Figure 3:
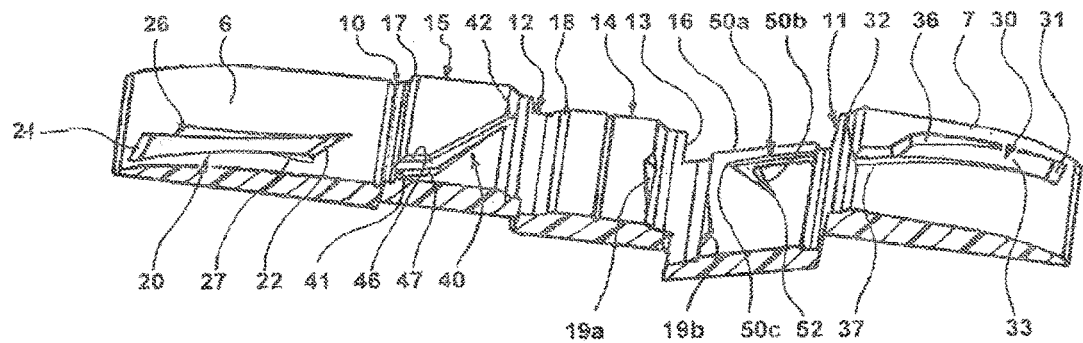
FIG. 3 is a schematic perspective view on an enlarged scale of a more limited portion of the tread band of FIG. 2, FIGS. 4 to 6 are views on an enlarged scale of respective details of the tread band of FIG. 2.
Figure 4:
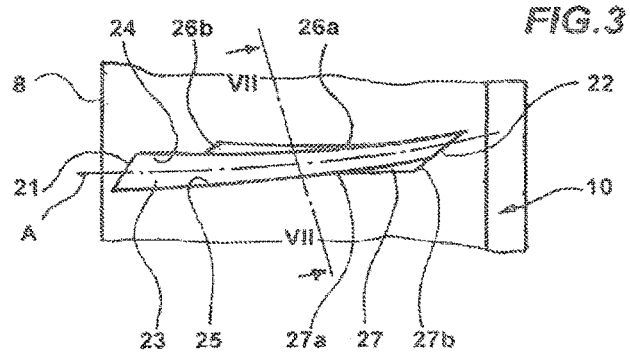
Figure 5:
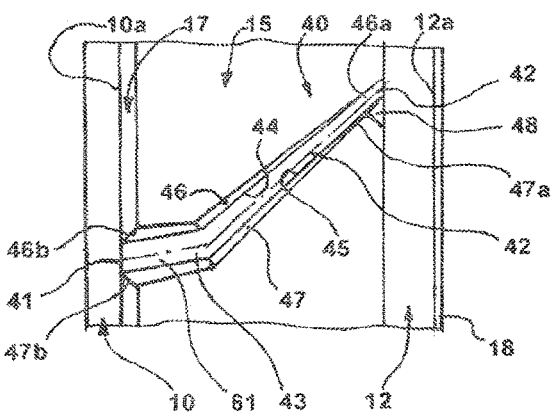
Figure 6:
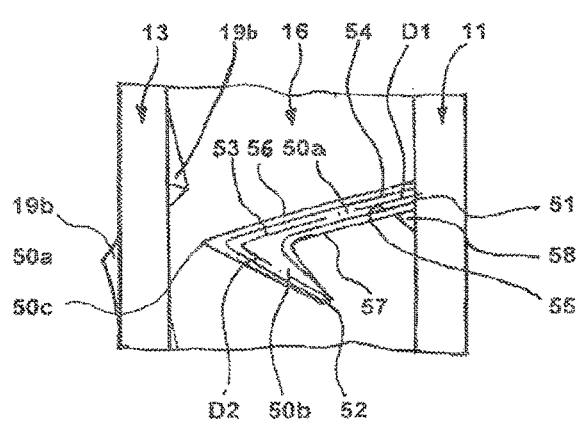

With particular reference to FIG. 3, each transverse groove 20 of the first plurality extends between a first, axially outer, end 21 and a second, axially inner, end 22, in a longitudinal direction A, preferably inclined relative to the equatorial plane X at an angle of between 70° and 90°.

The first and the second ends 21 and 22 do not open into further grooves.

Additionally, each transverse groove 20 of the first plurality comprises a bottom 23 and a pair of lateral walls 24, 25 facing one another and substantially parallel to the longitudinal direction A.

The lateral walls 24, 25 of each transverse groove 20 extend from the bottom 23 towards the tread surface 3 with a first inclination relative to a radial direction defined in the tyre 1, and are joined to the tread surface 3 by respective chamfers 26, 27, having a second inclination relative to this radial direction which is greater than the inclination of the lateral walls 24, 25.

Figure 7:
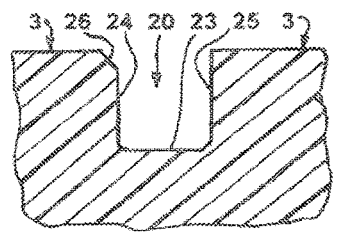
FIG. 7 is a sectional view along the line VII-VII of FIG. 3.

In an embodiment shown in FIG. 7, the lateral walls are substantially parallel to the radial direction (and the first inclination is therefore substantially zero, that is to say less than or equal to about 5°), while the chamfers 26 and 27 have an inclination of about 45°.

The distance between the bottom 23 and the tread surface 3, and therefore the depth of the transverse groove 20, varies along the direction of extension A of the groove, from about 2 mm at the first end 21 to about 6 mm at the second end 22. At the first end 21, where it is shallower, the transverse groove 20 extends towards the portion of tread band that curves towards the sidewall of the tyre, so that the portion of transverse groove 20 within the effective width of the tread band 2 maintains a depth of at least 5 mm.

Each transverse groove 20 also has a distance between the opposed lateral walls 24, 25 (not affected by the chamfer) which varies along the direction of extension A of the groove. In particular, the width of the transverse groove 20 not affected by the chamfers 26, 27 decreases from the first end 21 to the second end 22.

Preferably, the chamfers 26 and 27 are formed in portions of the transverse groove 20 in which the width between the lateral walls 24, 25 is smaller.

Additionally, each chamfer 26, 27 extends from the respective lateral wall 24, 25 along a longitudinal portion extending over about 30-50% of the development of the transverse groove 20.

Each chamfer 26, 27 has a tapered profile along its respective development, so that the edges formed by the chamfer with the lateral wall and with the tread surface 3 respectively have a substantially triangular configuration. In this configuration, the chamfer 26, 27 comprises respective vertices 26a, 27a, where the edges formed by the chamfer with the lateral wall and with the tread surface 3 respectively are joined, and respective bases 26*b* and 27*b*, towards which the aforesaid edges diverge. At the bases 26*b* and 27*b*, the size of the chamfer is about 2 mm.

Preferably, the vertices 26*a* and 27*a* are positioned in a middle part of the transverse groove 20, and the respective chamfers 26 and 27 extend towards the opposed longitudinal ends 21 and 22.

With reference to FIG. 3, each transverse groove 30 of the second plurality extends between a first, axially outer, end 31 and a second, axially inner, end 32, along a direction of extension B which is preferably inclined relative to the equatorial plane X at an angle of between 70° and 90°.

The first end 31 does not open into further grooves, while the second end 32 opens into the second circumferential groove 11.

Additionally, each transverse groove 30 of the second plurality comprises a bottom 33 and a pair of lateral walls 34, 35 facing one another and substantially parallel to the direction of extension B.

The lateral walls 34, 35 of each transverse groove 30 extend from the bottom 33 towards the tread surface 3 with a first inclination relative to a radial direction defined in the tyre 1, and are joined to the tread surface 3 by respective chamfers 36, 37, having a second inclination relative to this radial direction which is greater than the inclination of the lateral walls 34, 35.

In one embodiment, the lateral walls 34, 35 are substantially parallel to the radial direction, while the chamfers 36 and 37 have an inclination of about 45°.

The distance between the bottom 33 and the tread surface 3 varies along the direction B, from about 2 mm at the first end 31 to about 6 mm at the second end 32. At the first end 31, where it is shallower, the transverse groove 30 extends towards the portion of tread band that curves towards the sidewall of the tyre, so that the portion of transverse groove 30 within the effective width of the tread band 2 maintains a depth of at least 5 mm.

Each transverse groove 30 also has a distance between the opposed lateral walls 34, 35 (not affected by the chamfer) which varies along the direction of extension B of the groove. In particular, the width of the transverse groove 20 decreases from the first end 31 to the second end 32.

The chamfers 36 and 37 are formed in longitudinal portions of the transverse groove 30 in which the width between the lateral walls 34, 35 is smaller.

Additionally, each chamfer 36, 37 extends from the respective lateral wall 34, 35 along a portion extending over about 50% of the extension of the transverse groove 30.

Each chamfer 36, 37 preferably has a tapered profile along its respective development, so that the edges formed by the chamfer with the lateral wall and with the tread surface 3, respectively, have a substantially triangular configuration. In this configuration, the chamfer 36, 37 comprises respective vertices 36*a*, 37*a*, where the edges formed by the chamfer with the lateral wall and with the tread surface 3, respectively, are joined, and respective bases 36*b* and 37*b*, towards which the aforesaid edges diverge. At the bases 36*b* and 37*b*, the size of the chamfer is about 2 mm.

Preferably, the vertices 36*a* and 37*a* are positioned in a middle part of the transverse groove 30, and the respective chamfers 36 and 37 both extend towards the second end 32.

Each transverse groove 40 of the third plurality extends through the first lateral band 15 between a first, axially outer, end 41 and a second, axially inner, end 42, along a direction which has two portions with different inclinations. A first portion 40*a*, extending from the first end 41 over about 25% of the total extension of the transverse groove 40 along a direction C1, is inclined relative to the equatorial plane X at an angle between about 70° and about 90°, preferably about 80°, while a second portion 40*b*, extending after the first portion 40*a* to the second end 42 along a direction C2, is inclined relative to the equatorial plane X at an angle between about 40° and about 50°, preferably about 45°.

Each transverse groove 40 extends so as to run between the first circumferential groove 10 and the third circumferential groove 12, where the first and second ends 41 42, respectively, open.

Additionally, each transverse groove 40 of the third plurality comprises a bottom 43 and a pair of lateral walls 44, 45 facing one another.

The lateral walls 44, 45 of each transverse groove 40 extend from the bottom 43 towards the tread surface 3 with a first inclination relative to a radial direction defined in the tyre 1, and are joined to the tread surface 3 by respective chamfers 46, 47, having a second inclination relative to this radial direction which is greater than the inclination of the lateral walls 44, 45.

Preferably, the lateral walls 44, 45 are substantially parallel to the radial direction, while the chamfers 46 and 47 have an inclination of about 60°.

An auxiliary chamfer 48 is also formed on the edge of the third groove 12, at the second end 42 of the transverse groove 40.

The distance between the bottom 43 and the tread surface 3 varies along the direction C1-C2, from about 3 mm in the first portion 40*a* to about 5 mm at the second end 42, decreasing progressively along the second portion 40*b*. Each transverse groove 40 also has a distance between the opposed lateral walls 44, 45 (not affected by the chamfer) which varies along the direction C1-C2. In particular, the width of the transverse groove 40 decreases from the first end 41 to the second end 42.

The chamfers 46, 47 extend along the whole development of the transverse groove, and each has a tapered profile along its respective development, so that the edges formed by the chamfer with the lateral wall and with the tread surface 3, respectively, have a substantially triangular configuration.

In this configuration, the chamfer 46, 47 comprises respective vertices 46*a*, 47*a*, where the edges formed by the chamfer with the lateral wall and with the tread surface 3, respectively, are joined, and respective bases 46*b* and 47*b*, towards which the aforesaid edges diverge. At the bases 46*b* and 47*b*, the size of the chamfer is about 2 mm.

Preferably, the vertices 46*a* and 47*a* are positioned at the second end 42, and the respective chamfers 46 and 47 both extend towards the first end 41.

Each transverse groove 50 of the fourth plurality extends through the second lateral band 16 between a first, axially outer, end 51 and a second, axially inner, end 52, along a direction which has two portions with different inclinations. A first portion 50*a* extends from the first end 51 along a direction D1 which is inclined relative to the equatorial plane X at an angle between about 60° and about 80°, while a second portion 50*b* extends after the first portion 50*a* to the second end 52 along a direction C2 which is inclined relative to the equatorial plane X at an angle between about 50° and about 60°, preferably about 55°.

The second portion 50*b* is bent back towards the second circumferential groove 11, so that each transverse groove 50 has a cusp, with a hook-like configuration, with a point 50*c* opposed to the first end 51 and facing towards the equatorial plane X.

The first end 51 opens into the second circumferential groove 11, while the second end 52 is closed within the second lateral band 16.

The first end 51 of each transverse groove 50 opens into the second circumferential groove 11 in a position facing the second end 32 of a respective transverse groove 30. Additionally, the direction D1 is a prolongation of the direction B, so that each transverse groove 50 is substantially aligned with a corresponding transverse groove 30.

Additionally, each transverse groove 50 of the fourth plurality comprises a bottom 53 and a pair of lateral walls 54, 55 facing one another.

The lateral walls 54, 55 of each transverse groove 50 extend from the bottom 53 towards the tread surface 3 with a first inclination relative to a radial direction defined in the tyre 1, and are joined to the tread surface 3 by respective chamfers 56, 57, having a second inclination relative to this radial direction which is greater than the inclination of the lateral walls 54, 55.

Preferably, the lateral walls 54, 55 are substantially parallel to the radial direction, while the chamfers 56 and 57 have an inclination of about 30°.

An auxiliary chamfer 58 is also formed on the edge of the second groove 11, at the second end 52 of the transverse groove 50.

Each transverse groove 50 also has a distance between the opposed lateral walls 54, 55 (not affected by the chamfer) which is substantially constant along the longitudinal development of the first portion 50a, while in the second portion 50b this distances decreases progressively up to the second end 52.

The chamfers 56, 57 extend along the whole development of the transverse groove, and have a tapered profile having a substantially constant width, of about 1 mm for example, in the first portion 50a, and a tapered profile along the second portion 50b. In this second portion, the chamfers 56 and 57 have a substantially triangular configuration, with their respective vertices at the second end 52.

In addition to the chamfers formed on the transverse grooves described above, further chamfers are also advantageously formed on some circumferential grooves on the tread band 2.

In particular, a chamfer 17 is formed on an axially inner side 10a of the first circumferential groove 10, extending along the whole circumferential development of the first circumferential groove 10.

The chamfer 17 extends from the lateral wall of the first circumferential groove 10 to the tread surface 3, with an inclination relative to the tread surface of about 45° and a width of about 2 mm.

Additionally, a chamfer 18 is formed on an axially inner side 12a of the third circumferential groove 12, extending along the whole circumferential development of the third circumferential groove 12.

The chamfer 18 extends from the lateral wall of the third circumferential groove 12 to the tread surface 3, with an inclination relative to the tread surface of about 45° and a width of about 2 mm.

Additionally, respective pluralities of chamfers 19a and 19b are formed on both sides of the fourth circumferential groove 13, extending in segments along the circumferential development of the fourth circumferential groove 13.

The chamfers 19a and 19b are inclined relative to the tread surface 3 at an angle of about 45°.

Each chamfer 19a, 19b has a tapered profile along its respective development, so that the edges formed by the chamfer with the lateral wall of the fourth circumferential groove 13 and with the tread surface 3, respectively, have a substantially triangular configuration.

Preferably, the chamfers 19a extend from their respective vertices in a uniform manner along the circumferential direction, while the chamfers 19b extend from their respective vertices in a manner different from that of the chamfers 19a.

The width of the chamfers 19a, 19b at their respective bases opposed to their vertices is about 2 mm.

EXAMPLE

Tyres of the 245/40 R18 grade, under the trade name of Cinturato P1 Power Line, currently marketed by the applicant ("comparison"), were compared with tyres of the same grade having a tread pattern formed as shown in the drawings of the present document ("invention"), the latter tyres having a total void-to-rubber ratio of about 0.38 and a total void-to-rubber ratio of the chamfers formed on the grooves of about 0.06 (equal to about 15% of the total void-to-rubber ratio).

The applicant conducted a series of tests on various running surfaces, particularly on wet and dry road surfaces.

The test result are summarized in Table 1 below, in which the values of the judgements are expressed as percentages, with the values for the comparison tyres set at 100.

TABLE 1

|  | Comparison | Invention |
|---|---|---|
| Rolling resistance | 100 | 105 |
| Braking on dry surface | 100 | 105 |
| Braking on wet surface | 100 | 105 |
| Handling on dry surface | 100 | 104 |
| Handling on wet surface | 100 | 110 |

Thus the tyre 1 of the invention demonstrated a clear improvement overall, relative to the tyre with which it was compared.

The invention claimed is:
1. A tyre for vehicle wheels, comprising:
a tread band on which a radially external tread surface and a tread pattern are defined, wherein the tread band comprise:
a central region of the tread band, wherein the central region extends circumferentially about an equatorial plane of the tyre over a width equal to at least 30% of an effective width of the tread band; and
a first shoulder region and a second shoulder region, wherein each of the first and second shoulder regions extends, respectively, on opposite sides of the central region, in an axially outer position of the tread band, each over a width equal to at least 20% of the effective width of the tread band,
wherein the tread pattern on each of the first shoulder region, the second shoulder region, and the central region comprises, a first, second, and third plurality of transverse grooves, respectively, arranged successively along a circumferential extension of the tread band, wherein each of the transverse grooves comprises a bottom and a pair of opposed lateral walls, wherein the lateral walls of each transverse groove extend from the bottom towards the tread surface with a first inclination relative to a radial direction defined in the tyre and are joined, at least in one portion, to the tread surface by a respective chamfer with a second inclination, relative to the radial direction, which is greater than the first inclination, and wherein a void-to-rubber ratio of the respective chamfers is equal to at least 10% of a void-to-rubber ratio of the tread pattern; and wherein the first plurality of the transverse grooves of the first shoulder region and the second plurality of transverse grooves of the second shoulder region, each having a distance between the opposed lateral walls which is variable along the extension of the transverse groove, wherein at least a part of the respective chamfers is formed at portions in which the distance is smaller, wherein the chamfers on the opposed lateral walls of each transverse groove of the first and the second pluralities of transverse grooves have tapered profiles with a substantially triangular configuration, wherein each chamfer of the first plurality of transverse grooves comprises an edge formed by the respective chamfer with the respective lateral wall and an edge formed by the respective chamfer with the tread surface such that the edges are joined at a vertex and diverge towards a chamfer base, the vertex being positioned in a median portion of the respective transverse groove, wherein each of the first plurality of transverse grooves comprises the chamfers with tapered profiles on each of the opposed lateral walls, wherein the respective chamfer on one of the opposed lateral walls extends along the respective lateral wall from the respective vertex towards a longitudinal end of the respective transverse groove, and wherein the respective chamfer on the other one of the opposed lateral walls extends along the respective lateral wall from the respective vertex towards an opposed longitudinal end of the respective transverse groove.

2. The tyre according to claim 1, wherein each of the chamfers extends over a portion covering 30% to 50% of the development of the respective transverse grooves of the first plurality.

3. The tyre according to claim 1, wherein the chamfers with tapered profiles of each of the second plurality of transverse grooves extend along the opposed lateral walls from a respective vertex, and are defined in a median portion of the transverse groove, towards an axially inner end of each of the transverse grooves of the second plurality of transverse grooves.

4. The tyre according to claim 3, wherein the axially inner end of each of the transverse grooves of the second plurality of transverse grooves opens into a circumferential groove delimiting the second shoulder region.

5. The tyre according to claim 1, wherein each transverse groove of the third plurality of transverse grooves has a decreasing width.

6. The tyre according to claim 1, wherein each transverse groove of the third plurality of transverse grooves has opposed ends opening into respective circumferential grooves formed on the tread band.

7. The tyre according to claim 1, wherein each transverse groove of the third plurality of transverse grooves comprises a first portion with a first inclination relative to the equatorial plane and a second portion with a second inclination relative to the equatorial plane, wherein the second inclination is different from the first inclination.

8. The tyre according to claim 1, wherein the chamfers formed on the third plurality of transverse grooves extend substantially along the whole development of the opposed lateral walls.

9. The tyre according to claim 1, wherein the tread pattern in the central region further comprises a fourth plurality of transverse grooves with a cusp.

10. The tyre according to claim 9, wherein each transverse groove of the fourth plurality of transverse grooves has a first end, opposed to the cusp, and an opening into a circumferential groove formed on the tread band.

11. The tyre according to claim 9, wherein each transverse groove of the fourth plurality of transverse grooves is positioned substantially in alignment with a respective transverse groove of the second plurality of transverse grooves, formed in the second shoulder region.

12. The tyre according to claim 9, wherein chamfers are formed on the fourth plurality of transverse grooves and extend along the whole development of the opposed lateral walls of the transverse grooves.

13. The tyre according to claim 1, wherein the tread pattern further comprises a first circumferential groove separating the first shoulder region from the central region.

14. The tyre according to claim 13, wherein on a lateral wall of the first circumferential groove, a chamfer is formed and extends along the whole development of the first circumferential groove.

15. The tyre according to claim 1, wherein the tread pattern comprises a second circumferential groove separating the second shoulder region from the central region.

16. The tyre according to claim 1, wherein the tread pattern in the central region further comprises a third circumferential groove having a lateral wall on which a chamfer is formed and extends along the whole development of the third circumferential groove.

17. The tyre according to claim 1, wherein the tread pattern in the central region further comprises a fourth circumferential groove with a plurality of chamfers extending in segments on at least one lateral wall of the fourth circumferential groove.

18. The tyre according to claim 17, wherein the plurality of chamfers on the fourth circumferential groove extending in segments have a tapered profile with a substantially triangular configuration.

19. The tyre according to claim 1, wherein the tread pattern further comprises a plurality of circumferential grooves with chamfers, and wherein a void-to-rubber ratio of the circumferential grooves is at least equal to 10% of the void-to-rubber ratio of the tread pattern.

20. The tyre according to claim 1, wherein the tread pattern further comprises a plurality of circumferential grooves with chamfers, and wherein the void-to-rubber ratio of the respective chamfers formed on the plurality of transverse grooves and on the circumferential grooves is less than or equal to 25% of the void-to-rubber ratio of the tread pattern.

21. The tyre according to claim 1, wherein the second inclination of the respective chamfers ranges from 30° to 60°.

22. The tyre according to claim 1, wherein the respective chamfers are joined to the opposed lateral walls at a depth of not more than 50% of the distance between the tread surface and the bottom of the respective transverse groove.

23. The tyre according to claim 1, wherein the chamfers are joined to the opposed lateral walls at a depth of not more than 30% of the distance between the tread surface and the bottom of the respective transverse groove.

* * * * *